United States Patent [19]
Oki et al.

[11] Patent Number: 5,778,152
[45] Date of Patent: Jul. 7, 1998

[54] TRAINING METHOD FOR NEURAL NETWORK

[75] Inventors: Toru Oki, Kunitachi, Japan; Philip A. Paolella, Fort Lee, N.J.

[73] Assignees: Sony Corporation, Tokyo, Japan; Sony Electonics Inc., Park Ridge, N.J.

[21] Appl. No.: 242,387

[22] Filed: May 13, 1994

Related U.S. Application Data

[63] Continuation-in-part of Ser. No. 955,526, Oct. 1, 1992, abandoned.

[51] Int. Cl.$^6$ .................. G06E 1/00; G06E 3/00
[52] U.S. Cl. .................. 395/23; 395/21; 395/20; 395/24
[58] Field of Search .................. 382/227, 151, 382/158, 157, 156, 192, 290, 296, 257, 204, 288, 147, 291; 395/20–25, 27; 364/413.1

[56] References Cited

U.S. PATENT DOCUMENTS 5,546,503   8/1996   Abe et al. .................. 395/23

OTHER PUBLICATIONS

Khotanzad et al, "Distortion invariant character recognition by a multi-layer perceptron and back-propagation learning"; IEEE International conference on neural networks, pp. 625–632 vol. 1, 24–27, Jul. 1988.

*Primary Examiner*—Tariq R. Hafiz
*Attorney, Agent, or Firm*—Lise A. Rode, Esq.; Karin L. Williams, Esq.; Jerry A. Miller

[57] ABSTRACT

A neural network designed to recognize a particular character is supplied with initial tap weights for a first hidden node which are an image of the character to be recognized. The additive inverse of this set of weights is used as the tap weights for a second hidden node. A third node, if used, is initialized with random noise. The network is then trained with back propagation.

41 Claims, 12 Drawing Sheets

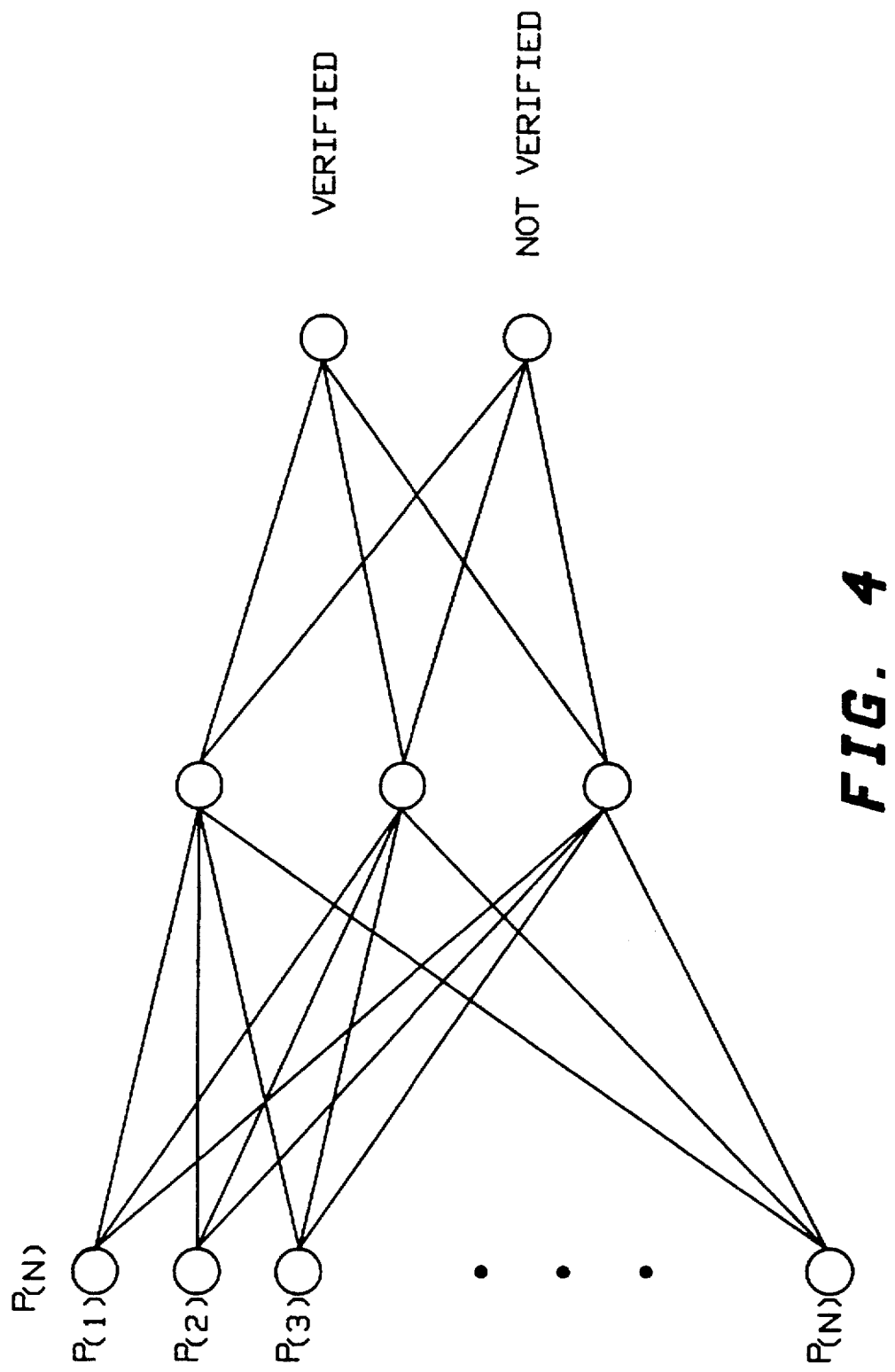

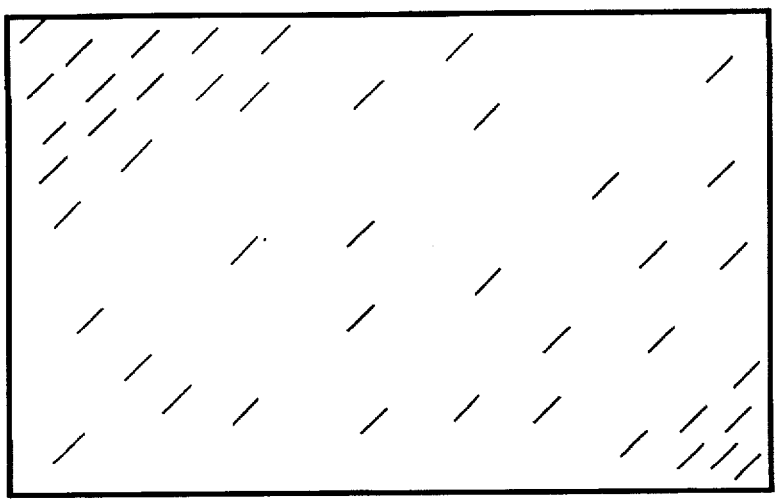
FIG. 5C  W₃(N)
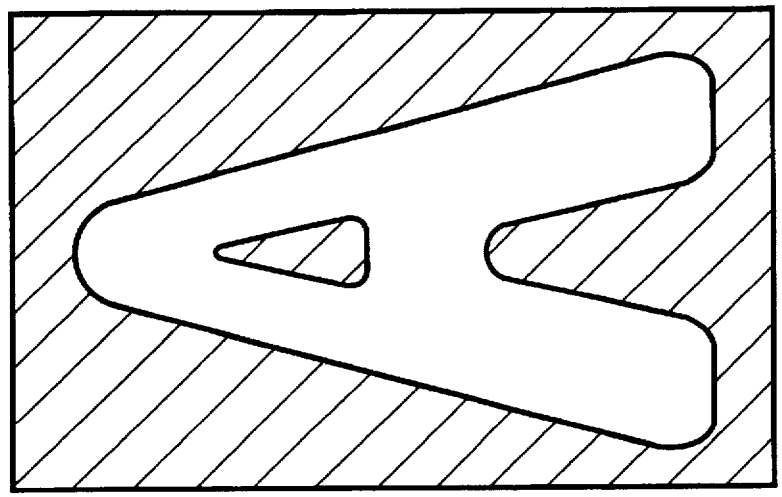
FIG. 5B  W₂(N)
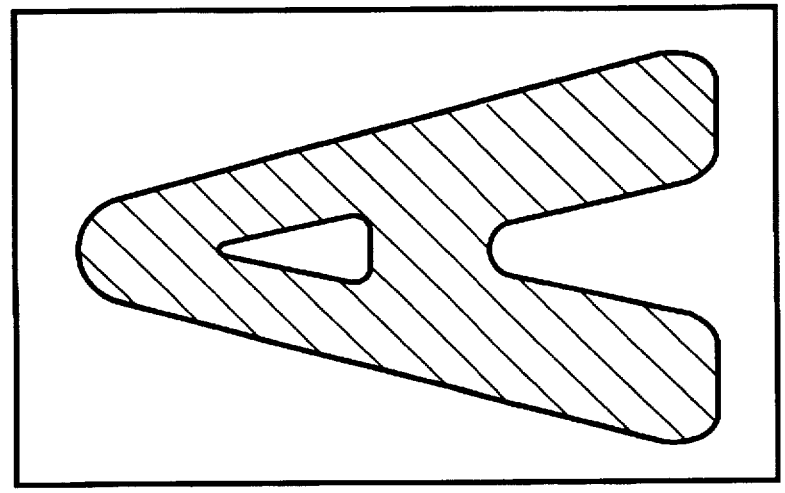
FIG. 5A  W₁(N)

TRAINING METHOD FOR NEURAL NETWORK

CROSS REFERENCE TO RELATED DOCUMENTS

This is a continuation-in-part of Ser. No. 07/955,526 filed Oct. 1, 1992 now abandoned which is hereby incorporated by reference. This application is related to copending commonly owned applications all filed on Oct. 1, 1992 as follows: Ser. No. 07/955,563 entitled "Training Method for Neural Networks Using Character Width Variation" of Toru Oki; Ser. No. 07/955,522 entitled "Training Method for Neural Network Using Offset Training Characters", of Toru Oki; Ser. No. 07/955,534 entitled "Neural Network for Character Recognition and Verification", of Toru Oki; and Ser. No. 07/955,555 entitled "Neural Network for Character Recognition of Rotated Characters" of Toru Oki et al. These applications are hereby incorporated herein by reference.

BACKGROUND

1. Field of the Invention

This invention relates generally to the field of neural networks. More particularly, this invention relates to a method and apparatus for training a neural network.

2. Background of the Invention

Character recognition is an important application of neural networks. Character recognition applications are used for recognition of text in documents as well as recognition of symbols and characters in industrial applications. The present invention is particularly well adapted to machine generated characters. In all applications, optimal accuracy in recognition of the characters is of great importance. Also important is simplicity of the network structure, ease of training, independence of the training on the training sequence used, robustness in the presence of noise, and ability of the network to generalize. An overview and background treatment of the various factors affecting neural network performance and training can be found in a paper entitled "Foundations of Neural Networks" by Patrick K. Simpson, published in *Artificial Neural Networks: Paradigms, Applications and Hardware Implementations*, edited by Sanchez-Sinencio et al., IEEE press, 1992, USA.

In conventional neural networks, both hardware and software, characters are recognized by providing a representation of the character to a neural network. Internal weighting functions are used to weigh the inputs to produce an output representative of the most likely character based upon a training process for training the network. Improving the quality of the training process is the subject of a large body of current research and is currently a major factor in determining the accuracy with which the neural network can identify the characters. In industrial applications, correct recognition of patterns or characters representing, for example, serial numbers can be critical to production control.

In some industrial applications, recognition of characters is not as important as verification that the characters are correct. Consider, for example, a production process for compact disks wherein a serial number representing the program material is imprinted on the disk prior to actual encoding of the disk with video, audio or computer data. A system which recognizes the characters might not be as important as one that verifies that each of a large batch of disks bears the correct serial number. Otherwise, a compact disk which has been imprinted with a label and serial number might be encoded with conflicting program material (e.g. an artist's music might be encoded on a disk with an incorrect label).

In the field of neural networks, among the more fundamental problems facing neural network designers is that of properly training the network. The present invention addresses this training problem and presents a method for initializing the weights associated with the network to provide an improved training method and a better performing network in many instances.

U.S. Pat. No. 5,119,469 to Alkon et al discloses a neural network which uses "excitory" synapses and "inhibitory" synapses. Excitory synapses are defined therein as those synapses with weights which have positive values. Inhibitory synapses are defined therein as those which have negative weight values. This patent provides little guidance in determining which synapses should be inhibitory and which should be excitory except to indicated that excitory synapses are "in the receptive field" while inhibitory synapses are "disposed adjacent to the outside border" of the receptive field. Alkon makes no disclosure of initializing such synapses with values having any relationship to values of the input to be detected. In the example given, a rectangular field represents an active array of input values. A border around the outside of this array is selected to be connected to inhibitory synapses while the synapses connected within this border are selected to be excitory. These synapses are initialized with small negative and positive weight values respectively and then the network is trained. In some areas of this specification, Alkon et al's language is adopted.

The so-called Nguyen-Widrow method of initializing weight values has been described in the literature as a technique for initializing weight values prior to training. This technique utilizes an algorithm which is only dependent upon the network geometry parameters (fan-in and number of hidden nodes) and allowable peak to peak input values in conjunction with a tan-sigmoid function to establish initial values for the weights. The Nguyen-Widrow method does not initialize weights using a function of an input pattern to be recognized.

The present invention provides a method to improve the accuracy, convergence and generalizing ability of many character or symbol recognition systems by providing a training technique using a technique for initialization of synapse weights, with initialization being dependent upon the expected input.

SUMMARY OF THE INVENTION

It is an object of the present invention to provide an improved character or symbol recognition method and apparatus having improved accuracy.

It is an advantage of the present invention that accuracy of recognition is enhanced.

It is another object of the invention to provide an improved method for training a neural network.

It is an advantage that the training techniques of the invention produce a robust network with strong ability to generalize with better convergence characteristics.

These and other objects, advantages and features of the invention will become apparent to those skilled in the art upon consideration of the following description of the invention.

A neural network of the present invention is designed to recognize a particular character and is supplied with initial tap weights for a first hidden node which are an image of the character to be recognized. The additive inverse of this set of weights is used as the tap weights for a second hidden node. A third node, if used, is initialized with random noise. The network is then trained with conventional back propagation.

According to one aspect of the present invention, a method for training a neural network to recognize a symbol represented by an input array P(K) includes the steps of providing an intermediate layer of the neural network; initializing a weighting function $W_1(K)$ associated with an intermediate node to values which are positively correlated with P(K) when P(K) contains a representation of a symbol to be recognized by the neural network; and applying a training sequence to the neural network. A second weighting function $W_2(K)$ associated with a second intermediate node is initialized to values which are negatively correlated with P(K) when P(K) contains a representation of a symbol to be recognized by the neural network. A third weighting function $W_3(K)$ associated with a third intermediate node can be initialized to random values.

In another aspect of the invention, a method for training a neural network to recognize a symbol represented by an input array P(K) where K is a number of values in said input array, includes the steps of: providing an input layer, an output layer and an intermediate layer of the neural network, the intermediate layer having two nodes; initializing an array of weights $W_1(K)$ relating the input layer with one of the two nodes with excitory weight values when P(K)=1 and inhibitory weight values when P(K)=0, with P(K) containing a representation of a character to be verified; and applying a training sequence to the neural network. The method preferably further includes the steps of: prior to the applying step, initializing an array of weights $W_2(K)$ relating the input layer with another of the two nodes with inhibitory weight values when P(K)=1 and excitory weight values when P(K)=0, with P(K) containing a representation of a character to be verified; and wherein the intermediate layer of the neural network has a third node, and initializing an array of weights $W_3(K)$ relating the input layer with the third node with random values.

In another aspect of the invention, a method for training a neural network, includes the steps of: selecting a pattern to be recognized by the neural network; pre-loading a set of weight values into the network, the set of weight values being a predetermined function of the pattern to be recognized; and training the network by applying a training sequence to the network and adapting the weight values according to a back-propagation process.

A neural network for detecting a desired input according to an aspect of the invention includes a plurality of input nodes, each for receiving one of a selected plurality of input signals. A plurality of hidden nodes is interconnected with the input nodes, each hidden node receiving a weighted version of the input signals and generates a sum of these weighted input signals modified by a sigmoidal transfer function as hidden node output signals. An output node produces a weighted sum of the hidden node output signals. The weighted sum of the input signals is produced by a weighting function which is first selected to be a predetermined function of the desired input and then adapted by training the neural network.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 2 represents an array of pixels making up an example letter "A".

FIG. 4 is a representation of the neural networks 30 of FIG. 1.

FIG. 5 illustrates the weighting function initialization of the network of FIG. 4.

DETAILED DESCRIPTION OF THE INVENTION

Figure 1:
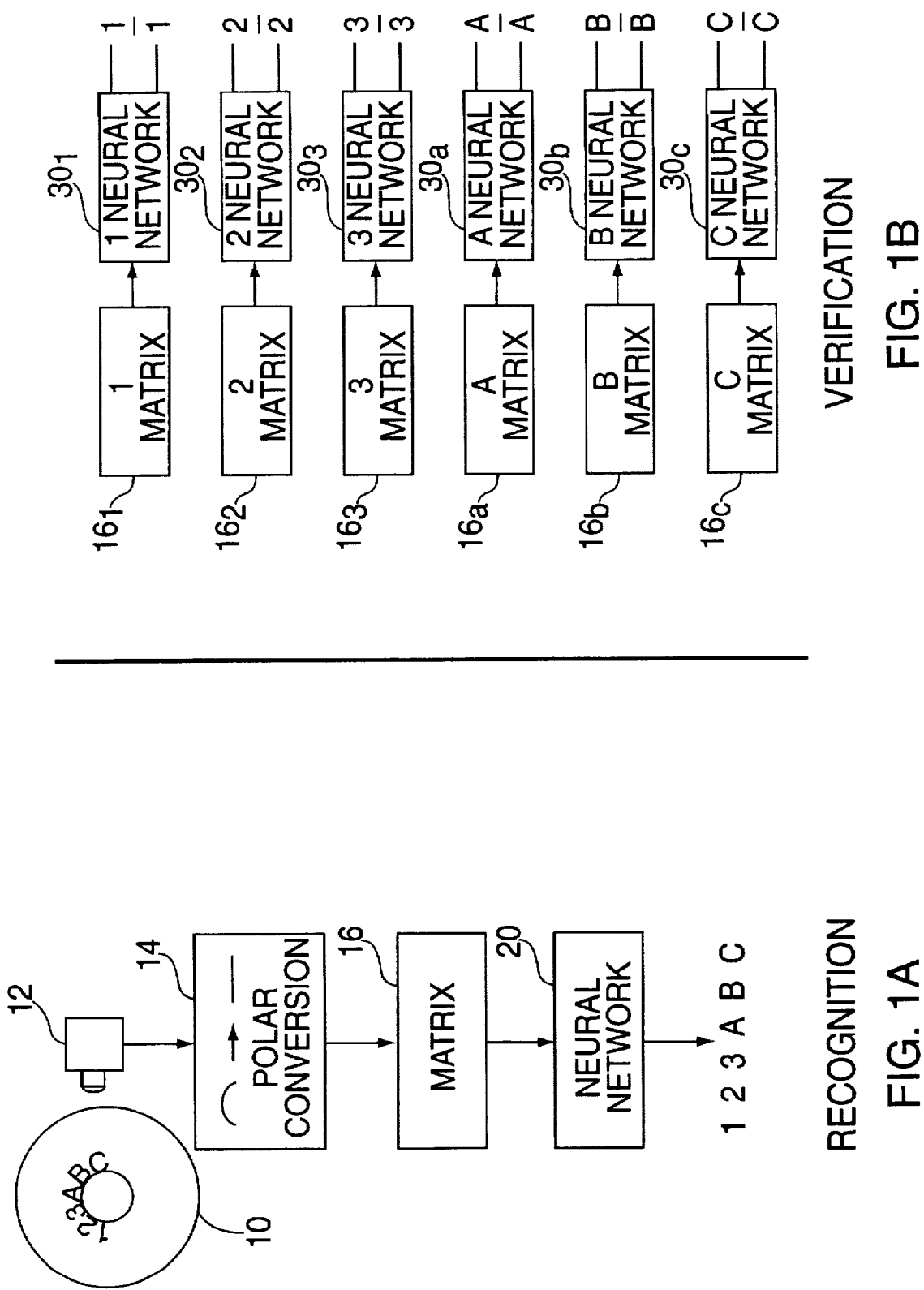
FIG. 1 is a block diagram illustrating the operation of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. For purposes of the present description, the term symbol and character will be used somewhat interchangeably with each intended to represent a member of a set of recognizable set members such as numbers, letters, graphic symbols, alphabet symbols or the like. These terms are also intended to embrace images useful in industrial applications such as and image of a gear, integrated circuit chip, a part or subassembly etc. or any other image or pattern which can be usefully recognized by a neural network. The terms inhibitory and excitory are adopted from the Alkon et al reference.

Turning now to FIG. 1, an example industrial application of the present invention is presented. Such an application might be used to recognize a serial number on a part, such as for example, a silicon wafer, circuit board, subassembly, compact disk, etc. Of course, other applications are possible. In this example, assume that a six digit serial number is to be recognized from a part 10, which in the preferred embodiments might be a compact disk or a silicon wafer for semiconductor manufacture. This part 10 is viewed in a particular location by a video camera or other scanning device 12.

Figure 2:
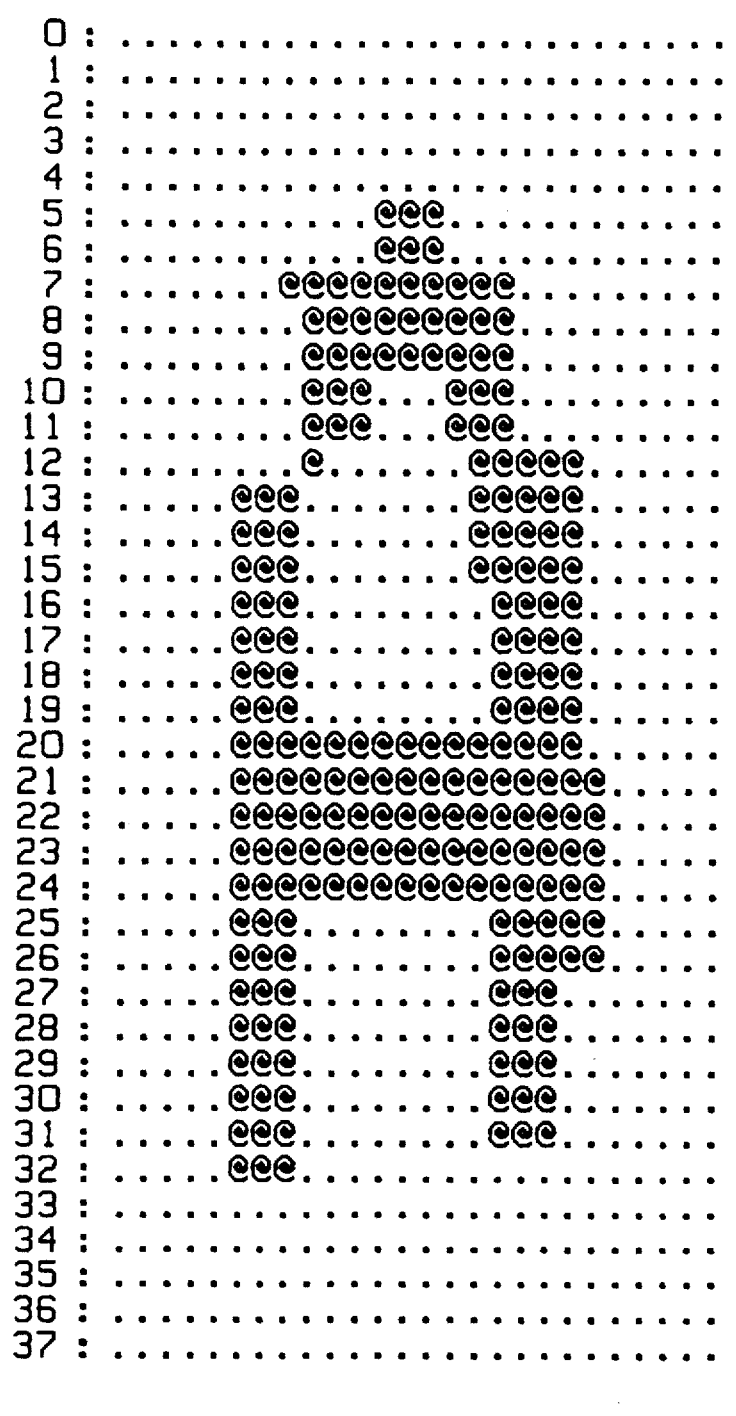

In the case where part 10 is a compact disk, the serial number encircles the central aperture of the disk. This makes recognition of the characters somewhat more difficult. The output of the camera 12 is processed by a polar converter 14 so that the arrangement of the characters is converted from the circular arrangement around the central aperture into a linear segmented sequence of characters as described more fully in the above related application (Ser. No. 07/955,555) which is incorporated by reference. Regardless of whether or not the image is circularly arranged, the segmentation and centering process described in the above application is used to improve the performance of the recognition and verification systems. The linear sequence of characters is then represented as a matrix or array 16 (or collection of matrices or arrays) representing each of the characters in a known manner. Typically, the matrix is made up of pixel values which represent the character being viewed. For example, consider a representation of the character "A" as shown in FIG. 2. In this representation, generated from an actual character as processed by the present invention, bright pixels are represented by "@" and dark images are represented by small dots. The row numbers are added for convenience. This character is represented in a computer file by a one dimensional pixel array P(K) of values described by the following (row number added for convenience):

| ROW | |
|---|---|
| 0 | 00000000000000000000000000 |
| 1 | 00000000000000000000000000 |
| 2 | 00000000000000000000000000 |
| 3 | 00000000000000000000000000 |
| 4 | 00000000000000000000000000 |
| 5 | 00000000000111000000000000 |
| 6 | 00000000000111000000000000 |
| 7 | 00000000111111111000000000 |
| 8 | 00000000111111111000000000 |
| 9 | 00000000111111111000000000 |
| 10 | 00000000111000111000000000 |
| 11 | 00000000111000111000000000 |
| 12 | 00000000010000011111000000 |
| 13 | 00000111000000011111000000 |
| 14 | 00000111000000011111000000 |
| 15 | 00000111000000011111000000 |
| 16 | 00000111000000001111000000 |
| 17 | 00000111000000001111000000 |
| 18 | 00000111000000001111000000 |
| 19 | 00000111000000001111000000 |
| 20 | 00000111111111111111000000 |
| 21 | 00000111111111111111100000 |
| 22 | 00000111111111111111100000 |
| 23 | 00000111111111111111100000 |
| 24 | 00000111111111111111100000 |
| 25 | 00000111000000001111100000 |
| 26 | 00000111000000001111100000 |
| 27 | 00000111000000001110000000 |
| 28 | 00000111000000001110000000 |
| 29 | 00000111000000001110000000 |
| 30 | 00000111000000001110000000 |
| 31 | 00000111000000001110000000 |
| 32 | 00000111000000000000000000 |
| 33 | 00000000000000000000000000 |
| 34 | 00000000000000000000000000 |
| 35 | 00000000000000000000000000 |
| 36 | 00000000000000000000000000 |
| 37 | 00000000000000000000000000 |

In the array above, arranged as 38 rows of 26 bits per row, P(1) appears in the upper left corner, P(2) is immediately to the right of P(1) and so on until P(988) in the bottom right hand corner. Although the present embodiment binarizes the pixel values to either a 1 or a 0, neural networks can also operate on analog values representing brightness of the pixels or other appropriate characteristics. The present invention is equally applicable to such networks.

The matrix 16, as represented by a plurality of arrays P, is used as an input to a more or less conventional neural network 20 which is trained to recognize each of the characters or symbols from a predetermined character or symbol set (e.g., the alphabet and digits 0–9).

Figure 3:
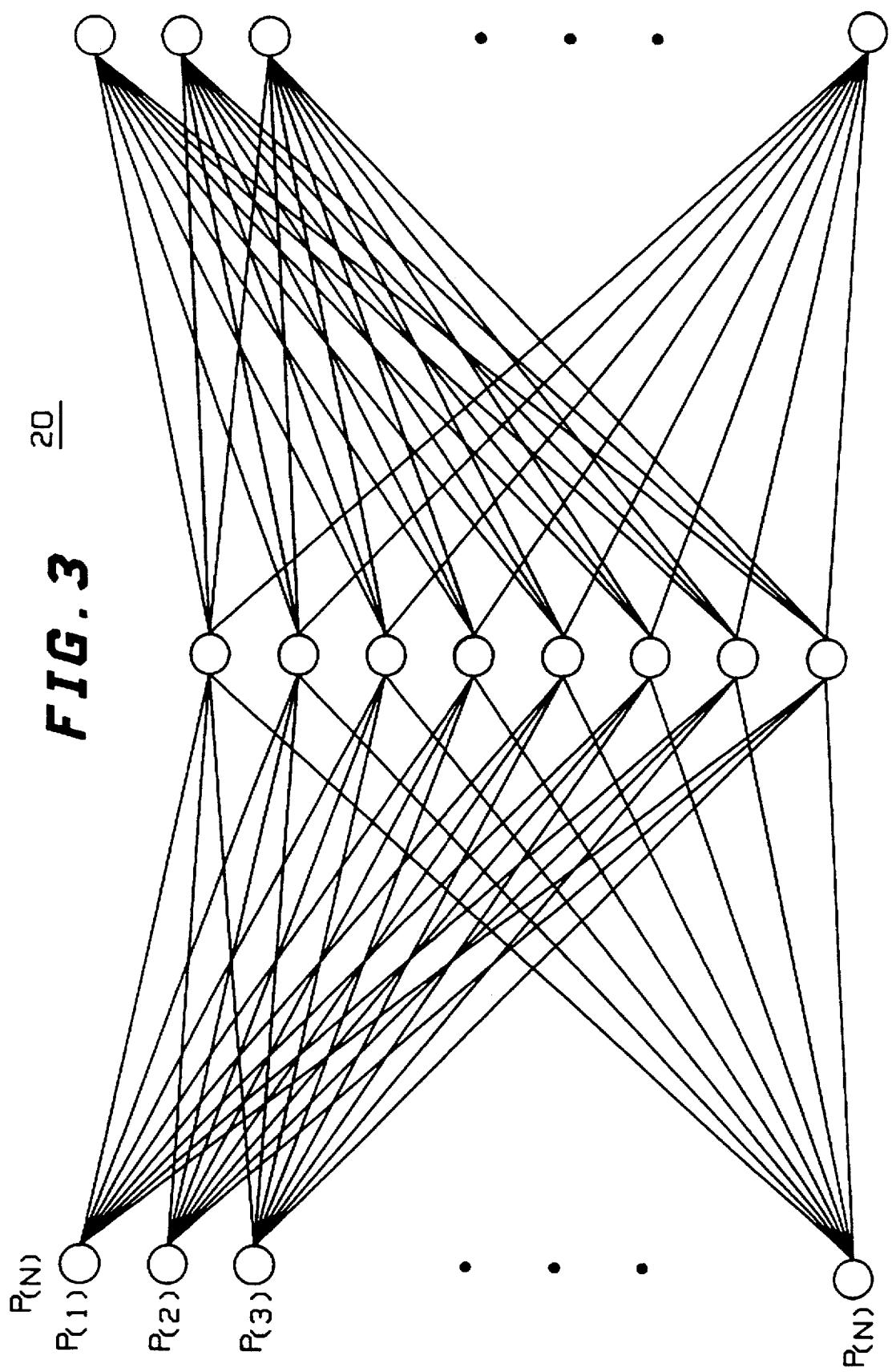
FIG. 3 is a representation of the neural network 20 of FIG. 1.

The neural network 20 of a test embodiment is shown in FIG. 3 and has 988 pixels (K=988) represented by an array of 988 pixels such as array P(K) as above. Each of the pixels is assigned a separate weight in the neural network (that is, the neural network has a fan-in of 988 in this embodiment) and is coupled to each of eight intermediate nodes each having a weight associated therewith. The intermediate nodes are each connected to an output node. In the present embodiment, fourteen such output nodes are used so that any of fourteen characters can be recognized. Conventional back propagation or other training techniques can be used for training this network 20. In the example shown, each character in the serial number is sequentially analyzed by the neural network 20 to produce a sequence of, for example, six characters making up a serial number. In the preferred embodiment, an eleven character serial number is recognized by sequentially applying eleven arrays P(K) to the neural network 20.

Referring back to FIG. 1, if the characters are correctly recognized by the network 20, the correct serial number is output. This output is then verified by a second set of neural networks as follows:

The serial number output from the neural network 20 as shown in the example of FIG. 1 is a six character code. Of course, in general any number of characters could be processed. To verify the serial number in this example, a recognition neural network 30 ($30_1$, $30_2$, $30_3$, $30_a$, $30_b$, $30_c$) is selected corresponding to each of the six characters of the serial number. Each such neural network is then provided with matrix $16_1$, $16_2$, $16_3$, $16_a$, $16_b$, $16_c$ for analysis. Matrix $16_1$ contains the representation for the character "1" held in matrix 16. Matrices $16_2$, $16_3$, $16_a$, $16_b$, $16_c$ similarly contain the representations for characters "2", "3", "a", "b" and "c" from matrix 16. Thus, if a character or symbol set has N characters or symbols, N such neural networks are made available for selection.

Each of these neural networks 30 can be substantially less complex than the neural network 20 and each is trained to recognize a single member of the character or symbol set. That is, each neural networks 30 is trained to recognize only a single character and not that character. Thus, network $30_b$ is trained to give a "yes" or "no" answer to whether the character being analyzed is a letter "b". To do so, the network is taught that "b" is the correct answer if the input is an image of the letter "b", and that "not b" is the correct answer if the input is an image of "a", "c"–"z", or "0"–"9". Thus, the output of network $30_b$ is either "b" or "not b". (Those skilled in the art will appreciate that the output of the neural networks are not pure binary, but rather, the output which is greatest controls.) Of course, an equivalent binary output can be generated wherein, for example, a "1" output represents verification of a particular character and a "0" output represents non-verification of the particular character.

If the network properly verifies each of the characters, the serial number can be presumed to have been correctly recognized with a high degree of confidence. If one or more of the symbols from the serial number are not verified, other steps can be taken to provide error recovery. Since the neural networks 30 are small, and the training is very specific to a single character, processing speed is very fast and the reliability is high.

FIG. 4 shows an example of a neural network 30 structure used in testing the present invention. This structure accepts the same 988 pixel array P(K) as network 20. These pixels are weighted and applied to an intermediate set of nodes having only two or three intermediate nodes (three are shown in FIG. 4). Weights for these intermediate nodes are used to produce outputs to two output nodes indicating that the character associated with this network is either verified or not verified. This network is simple, fast and comparatively easy to implement.

Depending upon the character to be verified by neural network 30, either two or three intermediate (hidden) nodes can be used when the network weights are initialized as will be described later. FIG. 4 shows three nodes, but many characters which do not exhibit excessive overlap with other characters can be verified with only two intermediate nodes. Those characters requiring three nodes, in general, do not readily converge with the training technique to be described when only two intermediate nodes are used. Characters requiring three nodes can be determined experimentally. With experience, such characters can be determined by inspection. However, the process could be automated, for example by use of a dot product of all possible character combinations. Character pairs with a dot product exceeding a predetermined threshold (determined experimentally) could then be verified with a neural network having three intermediate nodes. A test character set having the characters 0–9, A, R, O and @ was used for testing the present invention. Of these, verification networks were constructed for a subset of 1, 2, 4, 7, @, 0 and A. In this subset, three intermediate nodes were used only for the characters A, 0 and @. Two intermediate nodes appeared adequate for the remaining characters in this limited set.

A special training technique has been devised for these verification networks and is illustrated in FIG. 5 for a network trained to recognize the character "A". In this example, recall that there are three sets of weights associated with the inputs of the three intermediate nodes. These weights can be thought of as arrays $W_1(K)$, $W_2(K)$ and $W_3(K)$. In the example illustrated previously, K=988 since there are 988 pixels applied as inputs to the networks and the network has a fan-in of 988. Thus, their is a one to one correspondence between the input array P(K) and the weighting arrays $W_1(K)$, $W_2(K)$ and $W_3(K)$.

The neural network receives input values at the input layer. These input values are multiplied by the above weighting functions (one associated with each intermediate node) and then passed to each respective intermediate node. Each intermediate node then sums these weighted values and applies the sum to a transfer function. In the current case, this transfer function is preferably a log-sigmoid function with an output range of 0.0 to 1.0. Therefore, each intermediate node generates an output value based upon it's weighted input applied to the sigmoid function.

Typically, the neural network training process begins by initializing the weights with small random values. According to the present invention, it has been determined that improved training speed can be obtained with enhanced accuracy by strategically initializing (pre-loading) the weighting arrays prior to using a conventional back propagation training process or the like with values that correlate with the input character which the network is to recognize or verify. In the present case where three intermediate nodes are used and the network has only to provide two outputs, the weighting functions were selected as follows:

$$W_1(K) = \left\{ \begin{array}{l} +v, \text{ if } P(K) = 1 \\ -v, \text{ if } P(K) = 0 \end{array} \right\}$$

$$W_2(K) = \left\{ \begin{array}{l} -v, \text{ if } P(K) = 1 \\ +v, \text{ if } P(K) = 0 \end{array} \right\}$$

$$W_3(K) = \text{Random Noise}$$

where v is a positive number and where P(K) is an input array containing an ideal representation of the character to be verified. That is, the weighting functions are pre-loaded with a pattern resembling an ideal input array. In the present embodiment, the weight values in arrays $W_1(K)$ and $W_2(K)$ are initialized with numbers of the same absolute value (prior to randomizing with a small amount of random noise as described later), however this is not to be limiting as some advantage may be obtained in initialization with differing values in some embodiments. A wide range of values of v appears to be functional as will be explained later, but in general, any value of v which results in convergence of the network can probably be used.

In the preferred embodiment, the weighting function for the first tap $W_1(K)$ is selected to be a pattern which is highly positively correlated with an ideal input character. In fact, the correlation between $W_1(K)$ and P(K) is approximately 1.0 when P(K) contains an ideal representation of the character which the network is being trained to recognize. Thus, this node "fires" heavily (produces a large positive output) when a character close to ideal is applied to the input. The second weighting function $W_2(K)$ is selected to be the additive inverse of $W_1(K)$ so that it is highly negatively correlated with $W_1(K)$ and with P(K) when P(K) contains an ideal representation of the character which the network is being trained to recognize. In this case the correlation is approximately −1.0. Thus, the second node heavily inhibits firing (produces a small output) when a character close to ideal is applied as an input. This second node therefore rejects the ideal character. During training, of course, the weight values will be adapted. In the language of Alkon et al. in the previously referenced patent, the weights $W_1(K)$ are selected to be excitory when P(K)=1 and inhibitory for P(K)=0 when P(K) contains an ideal character to be recognized. Similarly, $W_2(K)$ are selected to be excitory when P(K)=0 and inhibitory for P(K)=1 when P(K) contains an ideal character to be recognized. To extend the language of Alkon et al, the intermediate node associated with $W_1(K)$ could be said to be an excitory node since it produces a high positive output when the ideal input is applied. The intermediate node associated with $W_2(K)$ could be said to be an inhibitory node since it produces a high negative output when the exact inverse of the ideal character is applied.

In this example (three hidden nodes) the third node, which is initialized with random noise, is added to provide a large enough weight space to achieve linear separability (the ability for networks to create sub-classes on the hidden nodes for proper convergence) when convergence cannot be obtained (or easily obtained) with two nodes. In other words, the third node provides the network with extra weights which help to distinguish between characters exhibiting substantial similarities (e.g. 0 and O and @, 8 and 3 and B, etc.). It is anticipated that if the number of characters which are to be recognized and distinguished is increased, more hidden nodes may be needed to achieve linear separability by further enlarging the weight space. In the experiments conducted, the random values are selected to have maximum and minimum values of +v and −v respectively, but this is not to be limiting since other values ranges can produce similar results.

If the weighting arrays are arranged in a 38×26 matrix similar to that shown in FIG. 2, with positive weight values represented as shaded regions and negative weights represented by clear regions, the above equations would appear something like the three arrays loosely illustrated in FIG. 5. The allowable range of weight values of a test embodiment were initially floating point numbers ranging from −3.2768 to +3.2768. In initial experiments, a value of +0.3 was used as for the positive value +v and a value of −0.3 was used for the negative value −v. At the time of these experiments, these values seemed to produce the best results of the values tried and permitted the weights to fluctuate in value both up and down in a satisfactory manner during training. Of course, further optimization is possible as will be discussed later. In these initial tests, weight values v ranging from ±0.1 to ±0.5 were tested successfully as values suitable for initialization of the tap weights. During these initial tests, when ±0.5 was used, results were perceived to be only slightly poorer than when ±0.3 was used as initialization values. Convergence seemed somewhat slower when ±0.1 was used as initial weight values. $W_3(K)$ was initialized with random noise having an even distribution in the range of +0.3 to −0.3. Further experiments were carried out later, as described in connection with FIGS. 11 and 12.

Those skilled in the art will understand that these weight values are somewhat specific to the embodiment shown, however the technique should be generally applicable when the weight values are scaled for the system at hand. The above weight values are scaled for a network sigmoidal output ranging in value from 0.0 to 1.0. In this case, good results were obtained when v is set to be approximately 1 to 100% of the dynamic range provided for tap weight values, but a relatively wide range of values can be expected to function based upon the initial test results and further experiments described later.

Those skilled in the art will understand that neural networks trained by back-propagation most commonly use a sigmoidal (e.g. a log-sigmoid) transfer function to compress an infinite range of values to an output having a manageable finite range of values. Typically, such a transfer function is used to process the output of each neuron or node of the network. While several transfer functions have been proposed for this purpose, sigmoidal transfer functions are most common. The networks tested in developing the present invention use a log-sigmoid transfer function with an output range of 0 to 1. Of course, the current invention can be used with other sigmoidal functions by appropriately scaling the transfer function and the values of v used to initialize the weights. Thus, for purposes of this invention, a sigmoidal transfer function should be considered to be any transfer function including log-sigmoid, tangential sigmoid, etc. or numerical approximations of these functions including piecewise linear sigmoid approximations, hard limiting functions and other mapping functions which map a neuron input interval to a finite output range (either with or without bias). This output range is referred to herein as a sigmoidal output range.

After initializing these weights, conventional back propagation was used with a plurality of passes of the character set as input. The character set was sequentially applied to the input in order with the character to be recognized interleaved with other character set members (e.g. A, B, A, C, A, D, . . . , A, Z, A, B, . . . , Z, . . . rather than A, A, A, A, B, B, . . . , Z when training the network to recognize "A") A. In the experiments conducted on these networks, it was desired to reduce the dependency of the network on the training sequence and to provide the network with the ability to generalize (recognize characters which are similar to the characters used in training, e.g., corrupted in some way so that they are not identical to those in the training sequence). The use of the above technique for initializing the tap weights achieved rapid convergence of the weights and reduced the dependency of the network on the training sequence.

In a variation of the present invention, the tap weights for the first and second hidden nodes, can be modified by a small amount of random noise after initialization and before the training process is initiated (or at some point during the training process) in order to help avoid local minima while training. This can be accomplished by multiplying the tap weights by random values between 0.9 and 1.1 for example (10% noise). Noise in the range of 10 to 25% is expected to produce the desired results. When such noise is added to the weight values, the correlation coefficient relating the weight values with an ideal input array may vary somewhat from +1 and −1 for $W_1(K)$ and $W_2(K)$ respectively. However, the weights will still have an extremely high positive and negative correlation with the ideal input array. In general, correlations >0.75 and <−0.75 could be considered high positive and negative correlation respectively and would be expected to produce similar results. An even broader range is also likely to be functional. In the tests conducted, the weights were correlated by +1.0 and −1.0 correlation coefficients respectively.

A further refinement to the training process was used to achieve generality of the network. In this technique, illustrated in FIG. 7, the network was first trained for a period of time using an ideal character set as a training sequence. After a period of time, the network was trained using an offsetting of the characters in the character set. In the tests conducted, 500 repetitions (cycles) of the sequence were used prior to offsetting. Then 1000 repetitions were used with offset added. Offset is not required to make the network converge, but it is important to note that convergence alone does not assure that the network will work properly for data which is not in the training set. The use of the present offset technique helps the network to generalize so that it is better able to recognize patterns which are not part of the training sequence. The present offset process has an additional benefit. Stray pixels on the edge of a character can cause the center of the character to shift. Offset during training simulates this shift and creates a network which is robust to such noise.

Figure 6C:
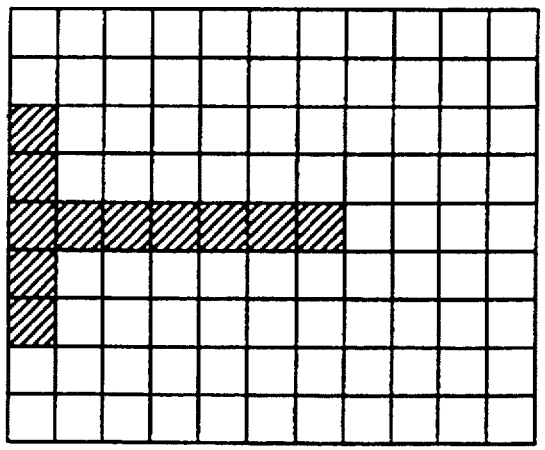
FIG. 6 illustrates the character offsetting used in the training process.
Figure 6B:
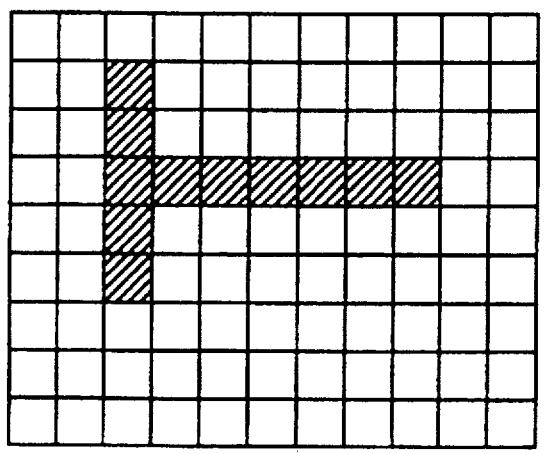
Figure 6A:
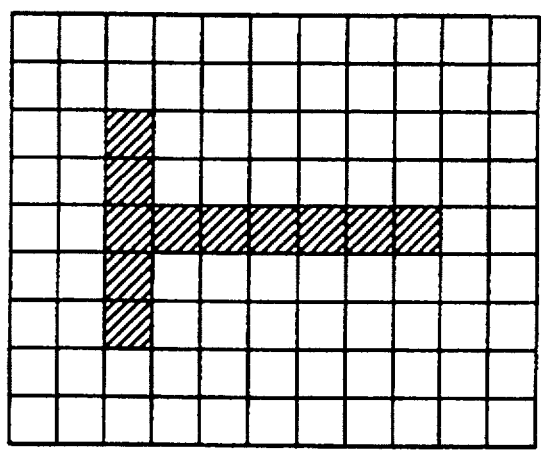

The offsetting process is illustrated in FIG. 6 with an example character "T". In FIG. 6A, the standard ideal character "T" is illustrated centered in a "character window". To achieve the desired generality, the character is shifted in the learning process by some number of pixels up, down, left or right. In FIG. 6B, the character has been offset by 1 pixel to the right. In FIG. 6C, the character has been offset by 2 pixels up. In test networks, a random offset was added in each repetition of the sequence. The offset could be as many as two pixels in any direction. So, a given repetition could be shifted (up 1, left 2), (down 0, right 1), (down 2, up 2), etc. The offset is changed randomly at each character of the training sequence for each repetition. Those skilled in the art will appreciate that some improvement in convergence might be expected if the offset were only applied to the character which was to be verified by the network. Other variations such as the number of pixels of offset and techniques for varying the offset will occur to those skilled in the art.

Figure 7:
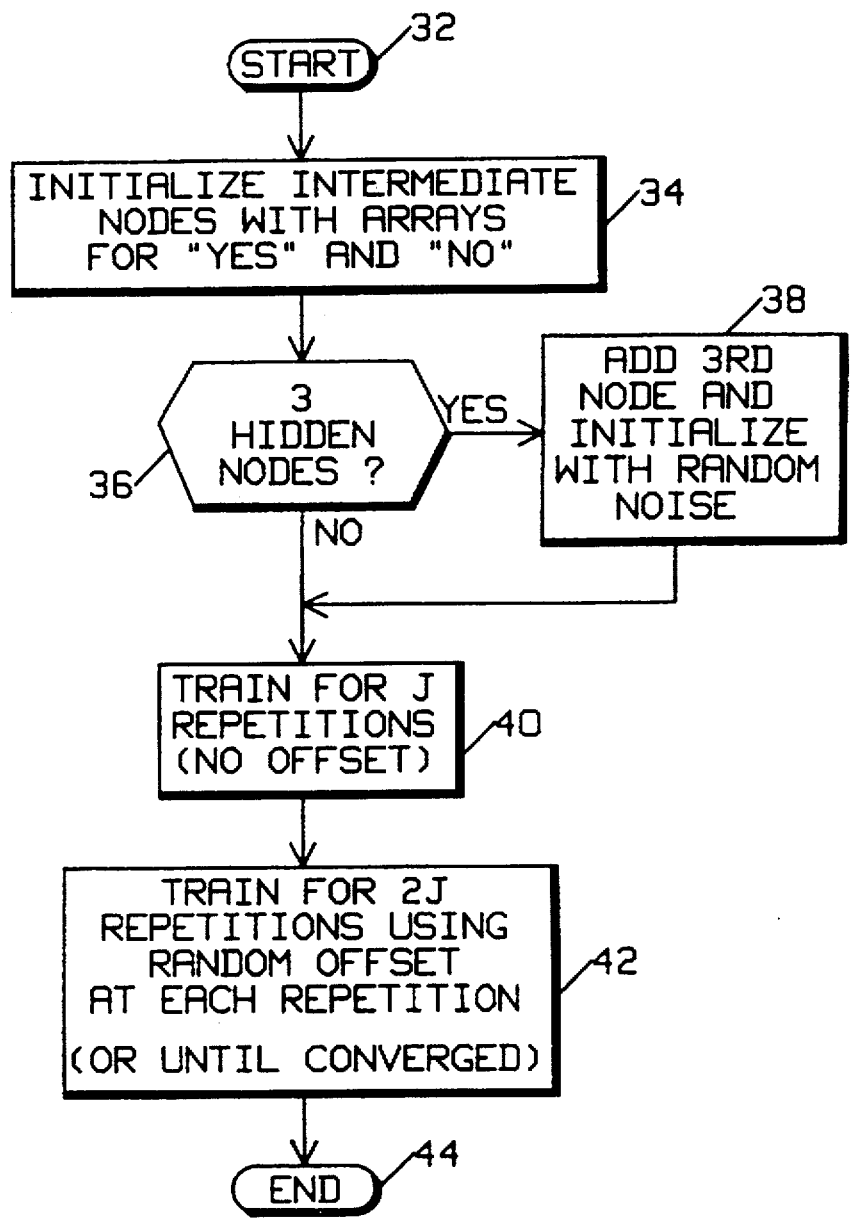
FIG. 7 is a flow chart of the training process of the present invention.

This training process is described in FIG. 7 starting at step 32. At step 34, two intermediate nodes (which can be considered "yes" and "no" nodes) are initialized with arrays correlating with the character to be recognized. One node is initialized with an array with positive value weights at each pixel in the character for which the network is being trained and negative values for the remaining pixels. This can be considered the "yes" node. The other node (the "no" node) is initialized with an array opposite that of the "yes" node (i.e., the additive inverse). The "yes" node will accumulate high values when the correct character is applied as an input and the "no" node will accumulate low values when the correct character is applied as an input.

At step 36, if the character is linearly inseparable from another character in the character set, a third node is used. At step 38, this node is initialized with random noise in a conventional manner. In either event, a training sequence containing all of the characters in the character set is applied at step 40 for a number of repetitions J. Depending on the circumstances, J can be experimentally optimized. In test networks, about 500 repetitions for J was found satisfactory. After J repetitions, the offsetting process is introduced wherein up to two pixels of random offset in any random direction is added during each repetition thereafter. About twice as many repetitions as in step 42 (about 1000 in the tests) was found satisfactory to achieve convergence and generality. The training ends at 44 after the prescribed number of repetitions or when convergence is achieved.

Once the values of the weights are determined by training, it is desirable to eliminate use of floating point computations since they require much greater computation time. To speed computation the final weights actually used are converted to sixteen bit integer values by scaling. Thus, a maximum tap weight of −3.2768 is represented as −32768 ($-2^{15}$ and a tap weight of +3.2768 is represented as +32768 ($+2^{15}$). Weights between these extremes are scaled accordingly. The initial maximum and minimum values of the weights were selected to simplify the conversion to a 16 bit integer by simply multiplying 10,000 (shifting the decimal place for places to the right and converting to integer). Other minimum or maximum values could be selected without departing from the invention.

Figure 8:
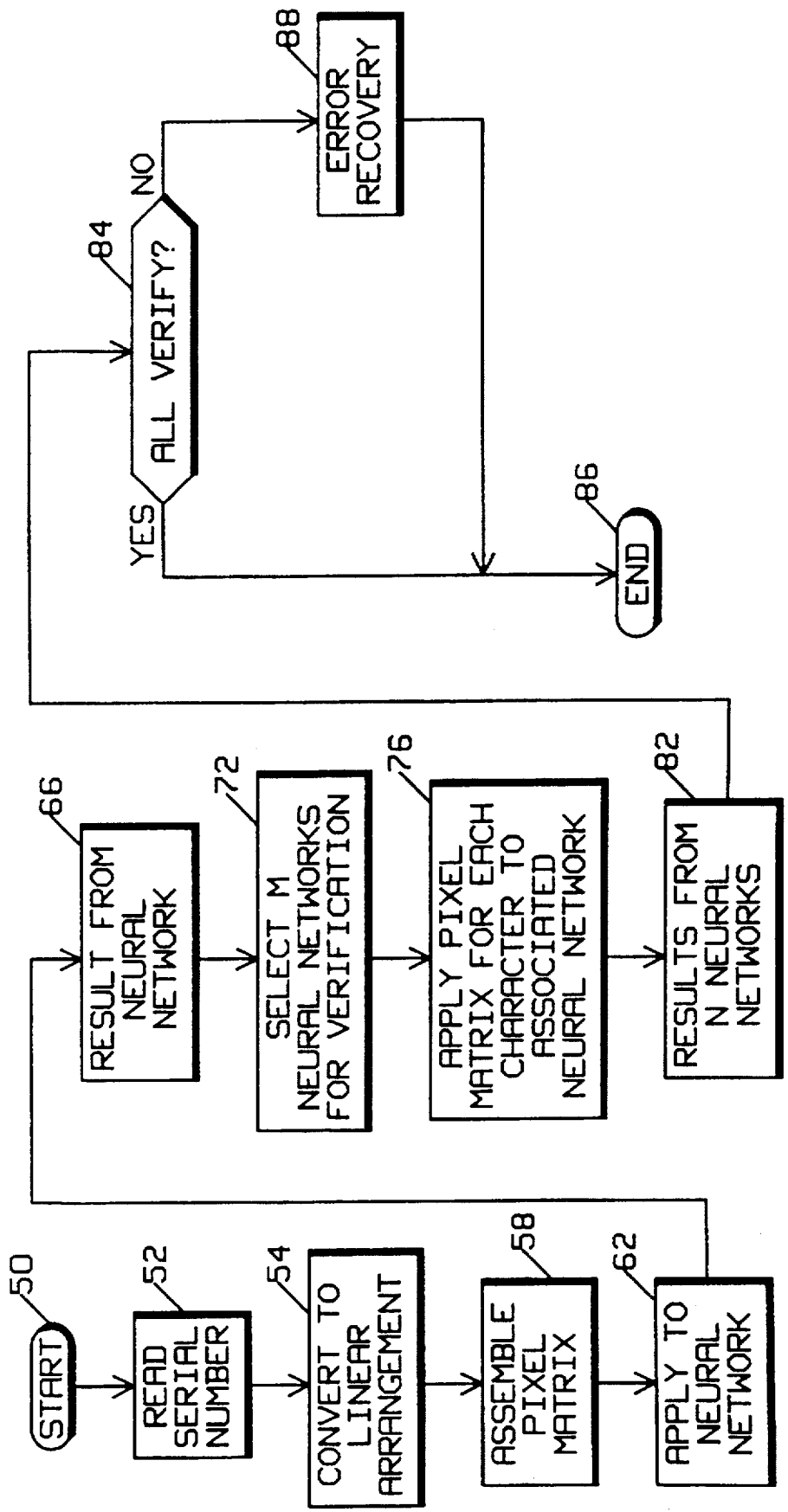
FIG. 8 is a flow chart of the operation of the present invention.

Turning now to FIG. 8, the present recognition and verification process is summarized in the form of a flow chart starting at step 50. At step 52 the serial number is scanned from part 10 to create an image representation usable by a computer or neural network circuit. Recall that for the preferred embodiment, the serial number is arranged in a semicircle around the center aperture of a compact disk. At step 54, the image is manipulated to convert the semicircular character arrangement into a linear arrangement such as that of FIG. 2 by rotating each character to a more readily readable arrangement as described in the copending application Ser. No. 07/955,555.

At step 58, a matrix is assembled containing the rotated characters. In general, it is desirable to isolate each character at this point into a separate matrix of pixels for processing. This matrix is then applied to a neural network at step 62, which is trained to recognize the members of an appropriate set of N characters or symbols. The neural network then produces a result at step 66 containing the network's best estimation of the value of each of the M characters or symbols of the serial number.

At step 72, a set of M smaller neural networks, one for each recognized symbol of the serial number, is selected from a collection of N such neural networks. Each of the N neural networks is trained to give only a "yes" or "no" answer in recognition of a single one of the N characters in the total character set. Each of the N neural networks is thus associated with recognition of a single character in the set.

At step 76, each of the individual matrices associated with a character in the serial number is associated with one of the M neural networks selected in step 72 so that the character image as represented by the pixel matrix for each character of the serial number is applied to a verification neural network associated with each recognized character from step 66. Each of the smaller M neural networks then analyzes the individual characters and provides a result at step 82 indicative of whether or not each character is believed to be correctly recognized. If all M characters of the serial number are correctly recognized at step 84, the process ends at 86. If all characters cannot be verified at step 84, an error recovery procedure can be instituted at step 88 prior to ending at 86.

Figure 9:
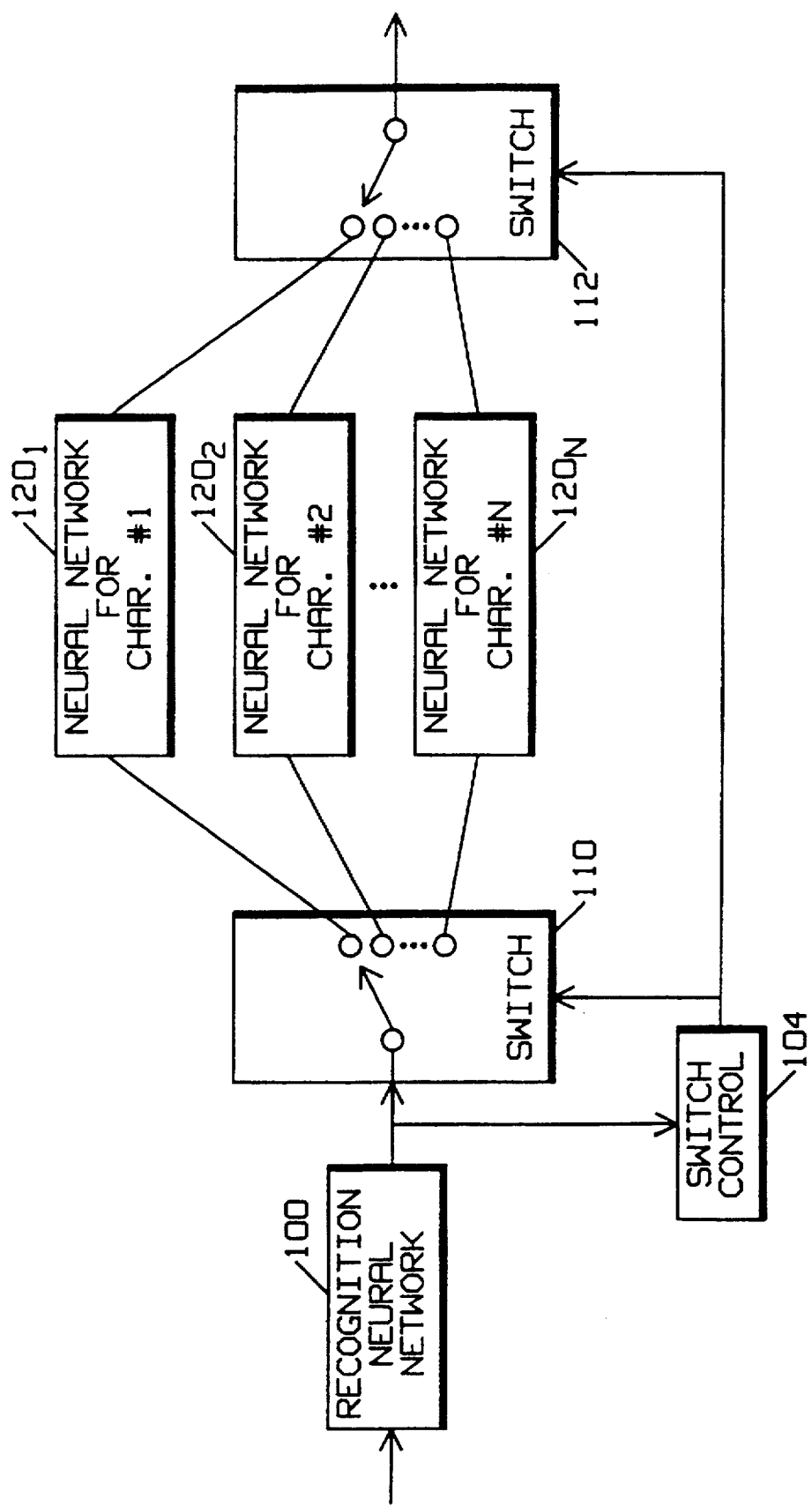
FIG. 9 is a block diagram of a character recognition and verification system of the present invention.

Referring to FIG. 9, an embodiment of a character recognition system according to the present invention is represented in block diagram form. In this system, a first neural network 100, or other network designed for character recognition, is used to initially recognize characters, an image of which is supplied to its input. Those skilled in the art will understand that the recognition process of 100 could also be manual reading and entry, or recognition followed by multiple verifications of the same serial number. In industrial applications, it is frequently the case that the recognition portion is only used once initially. Then the verification portion is used repeatedly for a plurality of parts which are verified. The output of network 100 is read at a switch control 104 which determines a position of switches 110 and 112 to select one of N character verification neural networks 120, thorough $120_N$. In the case of manual or other recognition of the characters in 100, the switching represented by switches 110 and 112 could also be implemented manually. Of course, other embodiments are possible without departing from the invention.

Figure 10:
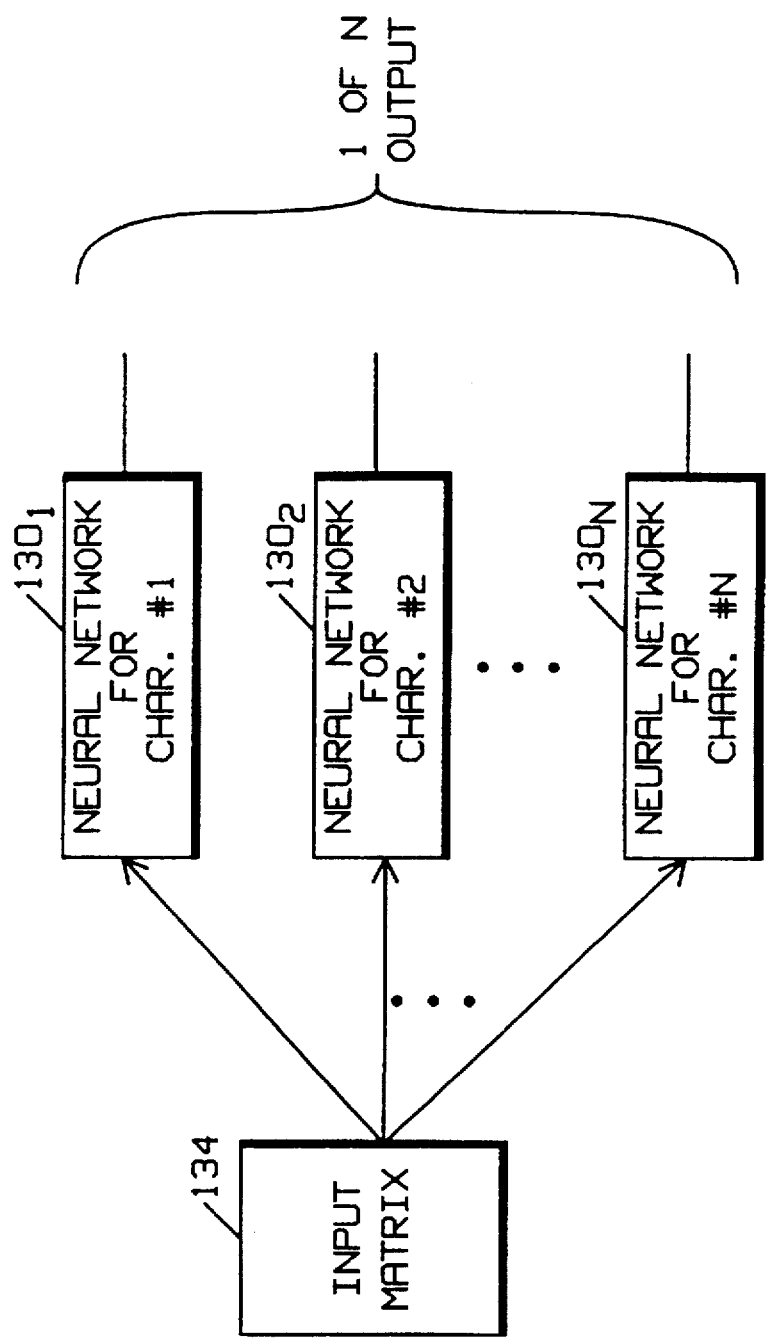
FIG. 10 is a block diagram of a character recognition system according to an alternative embodiment of the present invention.

While the preferred embodiment of the present invention, as described above, utilizes a plurality of smaller neural networks in a verification capacity, it is also contemplated that an array of such small neural networks can be used for character recognition. In a software embodiment, this can be implemented either with sequential or parallel processing. In a hardware embodiment, parallel connected neural network chips can be used to achieve rapid processing. This variation is illustrated in FIG. 10 wherein a character set of N characters would use a set of N small neural networks $130_1$ through $130_N$ receiving an input such as from input matrix 134. The N neural networks provide a 1-of-N output identifying the character or symbol.

Many variations of the present invention are possible. For example, although the current embodiment of the neural networks is implemented on a digital computer in the form of a computer program, hardware implementations are also possible and likely as the availability and cost of neural network circuits becomes more attractive. The present techniques are described in conjunction with three layer neural networks, but are generally applicable to networks with three or more layers. Also, although the present invention has been described in terms of a two step process for first recognizing and then verifying characters or symbols, those skilled in the art will appreciate that the verification process can be used alone in any environment where the characters or symbols are known in advance.

The training process can also be varied considerably without departing from the invention. For example, although a random variation of the offset is described, systematic application of an offset could also be devised. The organization of the training sequence as described is systematic but could be randomized. The weighting functions $W_1(K)$ and $W_2(K)$ could be used independently, one without the other.

The emphasis of the present invention has been on recognition of alphabetical or numerical type characters, but as mentioned previously, industrial applications such as machine vision applications may require that the object to be recognized is a part to be picked up by a robot, a part outline, a bar code or other image. Although three layer networks are disclosed, the techniques should extend to networks with more layers. Even though the inputs are binary values in the disclosed embodiments, analog or digitized analog inputs are also anticipated. In addition, while the present training method has been disclosed in terms of a three layer network with two or three hidden nodes which is used to recognize or verify a single character, the technique should be generally applicable to larger networks trained to recognize many characters. In such networks, the present training method could be used by providing inhibitory and excitory hidden nodes for each of the characters or patterns to be recognized. While the convergence characteristics of the present network arrangement appears to diminish with increased numbers of randomized hidden nodes, other benefits are likely to accrue in such networks. For example, the present training technique could be used to help resolve differences between characters that the network has difficulty distinguishing between by pre-loading the weight values to emphasize distinctions between the characters. Some degree of experimentation, as always, is required for optimizing the performance of any neural network. Other variations will occur to those skilled in the art.

EXPERIMENTAL RESULTS AND GENERALIZATION

In order to ascertain an appropriate range of values which function in the general case, a number of experiments were conducted. Due to the large number of variables associated with training neural networks, it is not practical to exhaust all possibilities, but the data obtained from these experiments indicate that the present training technique is generally applicable with success to a large body of neural network problems. In these experiments, the same 14 character set was used with 988 input nodes (i.e. the network fan-in=988). The tests were conducted by training the various test networks on the letter "A". The test network had a sigmoidal output range from zero to one. Networks with other sigmoidal transfer function can use the weight initialization values scaled appropriately for the sigmoidal transfer function of the network. Those skilled in the art will appreciate that the tests conducted provide a measurement of but one parameter of a neural network under certain conditions. Due to the large number of variables, exhaustive testing of all parameters is impractical.

In the tests conducted, the weights were initialized with various values of v in accordance with the above equations. The weight values were not modified with random values as described above in order to remove this factor from the testing. After initialization, samples of the characters were presented to the network a total of 39,000 times, alternating between the character "A" and characters which were not the character "A". The training characters were shifted but not changed in thickness during the training. During this process, back-propagation was used to adapt the weight values while the output of the network was monitored. As a measure of convergence, the number of outputs (either indicative of "A" or "not A") which exceeded 0.95 (out of a maximum of 1.0) were counted. This number of outputs is plotted on the convergence scale as an indication of the performance of the training technique.

Figure 11:
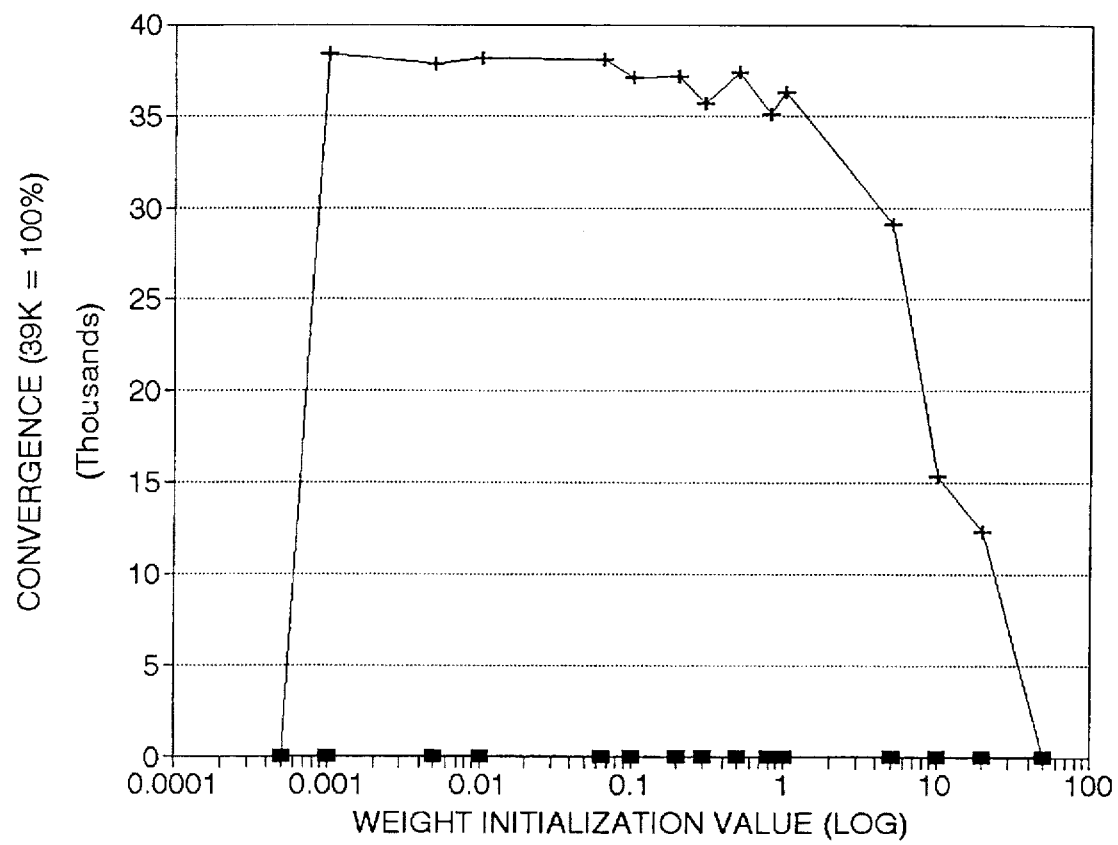
FIG. 11 is a plot of experimental data for a network having initialized nodes according to the present invention.

FIG. 11 shows the results of this testing for a network with three intermediate nodes such as that of FIG. 4 where one node is initialized with random values ranging from +v to −v and the other two nodes are initialized with +v and −v according to the above equations. The horizontal scale indicates that value of v used in initialization. As stated above, the maximum random values were also scaled to these same values, that is, when v=0.1 were used, excitory weights were set at +0.1 and inhibitory weights were set at −0.1 and the random values were linearly distributed between +0.1 and −0.1.

As mentioned previously, the sigmoidal output range for this network is 0.0 to 1.0. The test results indicated that a wide range of weight initialization values of approximately 0.001 to approximately 20 resulted in good convergence performance. Those skilled in the art will appreciate that in fact virtually any value of v can be made to work by varying the appropriate parameters (e.g. network configuration, random value distribution, input character set, etc.). Any value of v which results in convergence of the network in training is suitable. The value of 0.064 is approximately optimally centered in this range and appeared to produce the best results. Excellent convergence performance was obtained for values of v between approximately 0.01 and 1.0. For values below approximately 0.001, the incidence of occurrence of local minima in the training process was observed resulting in failure to converge in this test. Of course, by varying the network parameters, convergence could be expected to be achieved for lower values. For values at approximately 50 and greater, mathematical instability was observed, but again, by modification of network parameters convergence could be expected to be achieved for even higher values. Those skilled in the art will appreciate that the weight value of 0.064 is approximately equal to $2/(FAN-IN)^{1/2+ee}$ while the weight value of 0.1 is approximately equal to $3/(FAN-IN)^{+e \cdot fra \ 1/2}$, which have been found experimentally to provide near optimal convergence characteristics for networks having randomly initialized weights. Thus, the optimum value of v=0.064 could be expected to perform well in the general case. The test data which produced FIG. 11 is shown in TABLE 1 below.

It is interesting to note that in the range of approximately v=0.001 to v=1.0, the number of "Yes" outputs and "No" outputs >0.95 was approximately equal. When v>10.0, the number of "No" outputs >0.95 began to greatly exceed the number of "Yes" outputs >0.95. The significance, if any, of this is not currently understood, but it may be possible to use this as an indicator of a functional or operative range of values for v for a given network design. Intuitively, it would seem that the number of "Yes" and "No" outputs should be approximately the same when the current invention is functioning optimally. If this is the case, the optimal values would appear to be between about 0.001 and 5.0.

TABLE 1

| VALUE OF v USED TO INITIALIZE HIDDEN NODE WEIGHTS | # OF OUTPUTS >.95 |
| --- | --- |
| 0.00001 | LOCAL MINIMA |
| 0.0001 | LOCAL MINIMA |
| 0.0005 | LOCAL MINIMA |
| 0.001 | 38,344 |
| 0.005 | 37,897 |
| 0.01 | 38,150 |
| 0.064 | 38,088 |
| 0.1 | 37,129 |
| 0.2 | 37,233 |
| 0.3 | 35,676 |

15

TABLE 1-continued

| VALUE OF v USED TO INITIALIZE HIDDEN NODE WEIGHTS | # OF OUTPUTS >.95 |
|---|---|
| 0.5 | 37,383 |
| 0.8 | 35,097 |
| 1.0 | 36,336 |
| 5.0 | 29,143 |
| 10.0 | 15,344 |
| 20.0 | 12,304 |
| 50.0 | NUMERICAL INSTABILITY |

Figure 12:
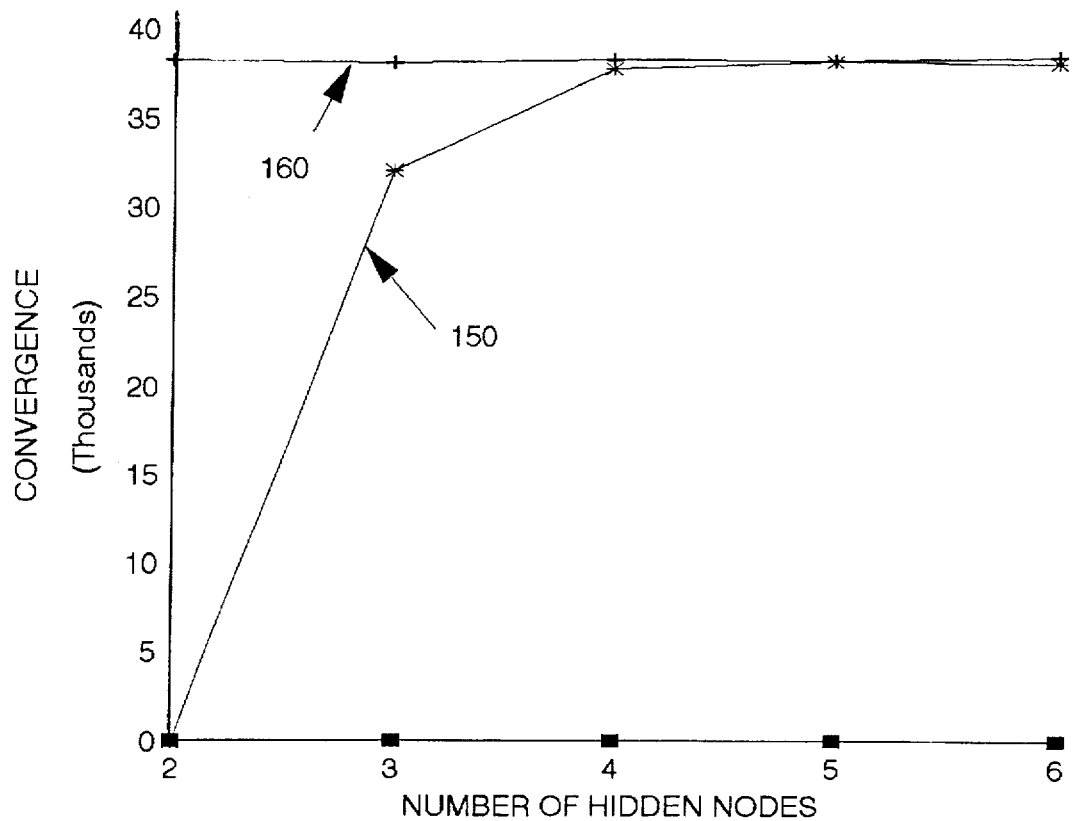
FIG. 12 is a plot of experimental data comparing a network with randomly weighted nodes with a network using initialized nodes according to the present invention.

Referring to FIG. 12, additional tests were conducted to determine the applicability of the present invention to a wider class of neural networks. In this series of tests, the weight initialization value was frozen at 0.064 while the number of intermediate nodes was varied from two to six. Again, training was carried out for the character "A". The tests were conducted for networks in which (1) two of the weights were initialized with positive and negative values of 0.064 while any remaining weights were initialized with random values from −0.064 to +0.064; and (2) for identical networks wherein the weights were all initialized in a conventional manner with values from −0.064 to +0.064. Curve 150 represents the networks which were initialized with all random weights. Curve 160 represents the networks which were initialized according to the present invention.

In each case, at least slightly better convergence performance was achieved when two nodes were initialized to be excitory and inhibitory nodes according to the present invention. The actual data plotted in FIG. 12 is shown below in Table 2. For two nodes, the network with all random weights encountered a local minima and never converged. The two node network with excitory and inhibitory weight initialization according to the invention very readily converged. For three nodes, the improvement was also substantial with approximately 32,000 values greater than 0.95 for the network with all random weights compared with over 38,000 values greater than 0.95 for the network initialized according to the present invention. The difference between performance of the two networks diminishes for networks of four nodes and greater. However, an advantage in the present invention remained even for networks with six hidden nodes. Of course, these results will vary depending upon the random values used to initialize the randomized node weights. Further experiments would be required to determine the other advantages of the present training technique in networks trained to recognize numerous characters.

TABLE 2

| NUMBER OF HIDDEN NODES | # OF OUTPUTS >.95 FOR ALL RANDOM INITIALIZATION | # OF OUTPUTS >.95 INHIBITORY AND EXCITORY NODES |
|---|---|---|
| 2 | LOCAL MINIMA | 38,291 |
| 3 | 32,012 | 38,088 |
| 4 | 37,706 | 38,283 |
| 5 | 38,118 | 38,225 |
| 6 | 38,070 | 38,439 |

In view of the above, the positive and negative values used in the weight functions $W_1(K)$ and $W_2(K)$ should take on values between about 0.001 to 20.0 although an even wider range can be expected to be functional in many cases. If the above speculation is correct, with regard to the balancing of "Yes" and "No" outputs, this range would more optimally be from 0.001 to 5.0. The graph indicates that the more optimal range of values of v should be about 0.01 to 1.0 with the best results having been achieved at about 0.064. Each of these values, of course, being scaled to a sigmoidal output range of 0.0 to 1.0.

Those skilled in the art of neural networks will appreciate that results of tests such as these will vary substantially depending on factors such as the input character under test, training data, fan-in, characteristics of the random data such as distribution and seed values, etc. Accordingly, the present experiments should be used as guidance in designing a neural network and not taken as absolutes. In view of the wide range of operational initialization values, it appears clear that the present invention is widely applicable to the neural network training problem.

In addition to the above comparative date, it is noted that convergence was rarely or never obtained for networks of two nodes for some characters except when those nodes are initialized with positive and negative values as taught herein. When this technique is used, much greater frequency of convergence was obtained, further demonstrating the value and applicability of the present invention.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for training a neural network to recognize a symbol represented by a binarized input array P(K) where K is a number of values in said input array, comprising the steps of:

providing an input layer, an output layer and an intermediate layer of said neural network, said intermediate layer having three nodes;

initializing an array of weights $W_1(K)$ relating to the input layer with one of said three nodes with excitory weight values when P(K)=1 and inhibitory weight values when P(K)=0, with P(K) containing a representation of a character to be verified;

initializing an array of weights $W_2(K)$ relating the input layer with another of said three nodes with inhibitory weight values when P(K)=1 and excitory weight values when P(K)=0, with P(K) containing a representation of a character to be verified;

initializing an array of weights $W_3(K)$ relating the input layer with another of said three intermediate nodes with random noise; and, applying a training sequence to said neural network.

2. The method of claim 1, further comprising the step of applying an offset to characters in a training sequence prior to applying said training sequence.

3. The method of claim 1, further comprising the step of applying a random offset to characters in a training sequence for a final portion of a training period.

4. A method for training a neural network to recognize a symbol represented by a binary input array P(K) where K is a number of values in said input array, comprising the steps of:

providing an input layer, an output layer and an intermediate layer of said neural network, said intermediate layer having three intermediate nodes;

each of said three intermediate nodes have a log-sigmoidal transfer function;

providing three arrays of values $W_1(K)$, $W_2(K)$ and $W_3(K)$ defined as follows:

$$W_1(K) = \left\{ \begin{array}{l} +v, \text{ if } P(K) = 1 \\ -v, \text{ if } P(K) = 0 \end{array} \right\}$$

$$W_2(K) = \left\{ \begin{array}{l} -v, \text{ if } P(K) = 1 \\ +v, \text{ if } P(K) = 0 \end{array} \right\}$$

$W_3(K)$ = Random Noise wherein v is selected to have a value in the range of 0.01 to 1.0, and wherein said random values are approximately evenly distributed between +v and −v, when normalized to a sigmoidal output range of 0.0 to 1.0, with P(K) containing a representation of a character to be verified;

modifying said weight values $W_1(K)$, $W_2(K)$ by multiplication with a random function having an even distribution between approximately 1±0.10 and 1±0.25;

initializing weights relating the input layer with each of said three nodes respectively with the modified values of $W_1(K)$, $W_2(K)$ and $W_3(K)$;

applying a training sequence to said neural network and adapting the values of said modified values of $W_1(K)$, $W_2(K)$ and $W_3(K)$ by back-propagation.

5. The method of claim 4, further comprising the step of applying an offset to characters in a training sequence prior to applying said training sequence.

6. The method of claim 4, further comprising the step of applying a random offset to characters in a training sequence for a final portion of a training period.

7. A method for training a neural network to recognize a symbol represented by an input array P(K) where K is a number of values in said input array, comprising the steps of:

providing an input layer, an output layer and an intermediate layer of said neural network, said intermediate layer having three intermediate nodes;

initializing an array of weights $W_1(K)$ relating the input layer with one of said three intermediate nodes with the following tap weights:

$$W_1(K) = \left\{ \begin{array}{l} +v, \text{ if } P(K) = 1 \\ -v, \text{ if } P(K) = 0 \end{array} \right\}$$

where v is a positive number, and with P(K) containing a representation of a character to be recognized;

initializing an array of weights $W_2(K)$ relating the input layer with another of said three intermediate nodes with the following tap weights:

$$W_2(K) = \left\{ \begin{array}{l} -v, \text{ if } P(K) = 1 \\ +v, \text{ if } P(K) = 0 \end{array} \right\};$$

initializing an array of weights $W_3(K)$ relating the input layer with said third intermediate node prior to said applying step with the following tap weights; and applying a training sequence to said neural network.

8. The method of claim 7, further comprising the step of applying an offset to characters in a training sequence prior to applying said training sequence.

9. The method of claim 8, further comprising the step of applying a random offset to characters in a training sequence for a final portion of a training period.

10. The method of claim 7, wherein said intermediate nodes have a sigmoidal transfer function, and wherein v has a value in the range of 0.001 to 20.0 when normalized to a sigmoidal output range of 0.0 to 1.0.

11. The method of claim 7, wherein said intermediate nodes have a sigmoidal transfer function, and wherein v has a value in the range of 0.01 to 1.0 when normalized to a sigmoidal output range of 0.0 to 1.0.

12. The method of claim 7, wherein said intermediate nodes have a sigmoidal transfer function, and wherein v has a value of approximately 0.064 when normalized to a sigmoidal output range of 0.0 to 1.0.

13. A method for training a neural network to recognize a symbol represented by a binary input array P(K) where K is a number of values in said input array, comprising the steps of:

providing an input layer, an output layer and an intermediate layer of said neural network, said intermediate layer having three intermediate nodes;

initializing arrays of weights $W_1(K)$, $W_2(K)$ and $W_3(K)$ relating the input layer with each of said three intermediate nodes respectively with the following tap weights:

$$W_1(K) = \left\{ \begin{array}{l} +v, \text{ if } P(K) = 1 \\ -v, \text{ if } P(K) = 0 \end{array} \right\}$$

$$W_2(K) = \left\{ \begin{array}{l} -v, \text{ if } P(K) = 1 \\ +v, \text{ if } P(K) = 0 \end{array} \right\}$$

$W_3(K)$ = Random Noise with P(K) containing a representation of a character to be verified;

wherein said intermediate nodes have a sigmoidal transfer function, and wherein v is selected to have a value in the range of 0.001 to 20.0 when normalized to a sigmoidal output range of 0.0 to 1.0; and applying a training sequence to said neural network.

14. The method of claim 13, wherein said random values are selected to vary from +v to −V.

15. The method of claim 13, further comprising the step of applying an offset to characters in a training sequence prior to applying said training sequence.

16. The method of claim 13, further comprising the step of applying a random offset to characters in a training sequence for a final portion of a training period.

17. A method for training a neural network to recognize a symbol represented by an input array P(K) where K is a number of values in said input array, comprising the steps of:

providing an input layer, an output layer and an intermediate layer of said layer of said neural network, said intermediate layer having three intermediate nodes;

initializing arrays of weights $W_1(K)$, $W_2(K)$ and $W_3(K)$ relating the input layer with each of said three intermediate nodes respectively with the following tap weights:

$$W_1(K) = \left\{ \begin{array}{l} +v, \text{ if } P(K) = 1 \\ -v, \text{ if } P(K) = 0 \end{array} \right\}$$

$$W_2(K) = \left\{ \begin{array}{l} -v, \text{ if } P(K) = 1 \\ +v, \text{ if } P(K) = 0 \end{array} \right\}$$

$W_3(K)$ = Random Noise with P(K) containing a representation of a character to be verified; and applying a training sequence to said neural network.

18. The method of claim 17, wherein said intermediate nodes have a sigmoidal transfer function, and wherein v has a value in the range of 0.001 to 20.0 when normalized to a sigmoidal output range of 0.0 to 1.0.

19. The method of claim 17, wherein said intermediate nodes have a sigmoidal transfer function, and wherein v has a value in the range of 0.01 to 1.0 when normalized to a sigmoidal output range of 0.0 to 1.0.

20. The method of claim 17, wherein said intermediate nodes have a sigmoidal transfer function, and wherein v has a value of approximately 0.064 when normalized to a sigmoidal output range of 0.0 to 1.0.

21. The method of claim 17, wherein said applying step includes training said neural network by back propagation.

22. The method of claim 17, further comprising the step of applying an offset to characters in a training sequence prior to applying said training sequence.

23. The method of claim 17, further comprising the step of applying a random offset to characters in a training sequence for a final portion of a training period.

24. A method for training a neural network to recognize a symbol represented by an input array P(K) where K is a number of values in said input array, comprising the steps of:

providing an input layer, an output layer and an intermediate layer of said neural network, said intermediate layer having three intermediate nodes;

initializing an array of weights $W_2(K)$ relating the input layer with one of said three intermediate nodes with the following tap weights:

$$W_2(K) = \left\{ \begin{array}{l} -v, \text{ if } P(K) = 1 \\ +v, \text{ if } P(K) = 0 \end{array} \right\}$$

initializing an array of weights $W_3(K)$ relating the input layer with one of said three intermediate nodes with the following tap weights:

$W_3(K)$=Random Noise where said intermediate nodes have a sigmoidal transfer function, and wherein v is a positive number, and with P(K) containing a representation of a character to be verified; and applying a training sequence to said neural network.

25. The method of claim 24, wherein v has a value in the range of 0.001 to 20.0 when normalized to a sigmoidal output range of 0.0 to 1.0.

26. The method of claim 24, wherein v has a value in the range of 0.01 to 1.0 when normalized to a sigmoidal output range of 0.0 to 1.0.

27. The method of claim 24, wherein v has a value of approximately 0.064 when normalized to a sigmoidal output range of 0.0 to 1.0.

28. The method of claim 24, further comprising the step of:

prior to said step of applying a training sequence, initializing an array of weights $W_1(K)$ relating the input layer with one of said three nodes with the following tap weights:

$$W_1(K) = \left\{ \begin{array}{l} +v, \text{ if } P(K) = 1 \\ -v, \text{ if } P(K) = 0 \end{array} \right\}.$$

29. The method of claim 24, further comprising the step of applying an offset to characters in a training sequence prior to applying said training sequence.

30. The method of claim 24, further comprising the step of applying a random offset to characters in a training sequence for a final portion of a training period.

31. A method for training a neural network to recognize a symbol represented by an input array P(K) where K is a number of values in said input array, comprising the steps of:

providing an input layer, an output layer and an intermediate layer of said neural network, initializing an array of weights $W_1(K)$ relating the input layer with a first intermediate node to values which are positively correlated with P(K) when P(K) contains a representation of a symbol to be recognized by said neural network;

initializing an array of weights $W_2(K)$ relating the input layer with a second intermediate node to values which are negatively correlated with P(K) when P(K) contains representation of a symbol to be recognized by said neural network;

initializing an array of weights $W_3(K)$ relating the input layer with a third intermediate node to random values; and, applying a training sequence to said neural network.

32. The method of claim 31, wherein $W_2(K)$ is the additive inverse of $W_1(K)$.

33. The method of claim 31, wherein the correlation between $W_1(k)$ and P(K) is approximately 1.0.

34. The method of claim 31, wherein the correlation between $W_2(k)$ and P(K) is approximately −1.0.

35. The method of claim 31, further comprising the step of applying an offset to characters in a training sequence prior to applying said training sequence.

36. The method of claim 31, further comprising the step of applying a random offset to characters in a training sequence for a final portion of a training period.

37. A method for training a neural network having an input layer which is interconnected with three hidden nodes, comprising the steps of:

selecting a symbol for recognition by said neural network;

representing said symbol as an array of input values; and initializing a first set of weights relating the first of said hidden nodes with said input layer, said first set of weights having weight values which are positively correlated with said array input values;

initializing a second set of weights relating the second of said hidden nodes with said input layer, said second set of weights having weight values which are negatively correlated with said array of input values; and initializing a third set of weights relating the third of said hidden nodes with said input layer, said third set of weights having weight values initialized as random noise.

38. The method of claim 37, further comprising the step of scaling each of said weight values by a random multiplication factor to produce a set of randomly scaled weights used for said initialization, prior to initializing said weights.

39. The method of claim 37, further comprising the step of applying a training sequence to said neural network, which is performed subsequent to said initializing step.

40. The method of claim 37, further comprising the step of applying an offset to characters in a training sequence prior to applying said training sequence.

41. The method of claim 37, further comprising the step of applying a random offset to characters in a training sequence for a final portion of a training period.

* * * * *